(12) United States Patent
Chang et al.

(10) Patent No.: US 7,440,041 B2
(45) Date of Patent: Oct. 21, 2008

(54) METHOD OF FABRICATING ARRAY SUBSTRATE HAVING COLOR FILTER ON THIN FILM TRANSISTOR STRUCTURE

(75) Inventors: Youn-Gyoung Chang, Gyounggi-do (KR); Seung-Ryull Park, Incheon (KR)

(73) Assignee: LG Display Co., Ltd., Seoul (KR)

( * ) Notice: Subject to any disclaimer, the term of this patent is extended or adjusted under 35 U.S.C. 154(b) by 211 days.

(21) Appl. No.: 11/542,158

(22) Filed: Oct. 4, 2006

(65) Prior Publication Data

US 2007/0024790 A1 Feb. 1, 2007

Related U.S. Application Data

(62) Division of application No. 10/728,835, filed on Dec. 8, 2003, now Pat. No. 7,130,001.

(30) Foreign Application Priority Data

Dec. 23, 2002 (KR) ........................ 10-2002-0082727

(51) Int. Cl.
*G02F 1/136* (2006.01)
*G02F 1/1335* (2006.01)
*G02F 1/13* (2006.01)

(52) U.S. Cl. ................... 349/43; 349/106; 349/187; 345/88; 345/92; 257/59

(58) Field of Classification Search ................ 349/43, 349/106, 187; 345/88, 92; 257/59
See application file for complete search history.

(56) References Cited

U.S. PATENT DOCUMENTS 6,118,505 A * 9/2000 Nagata et al. ............... 349/106

6,330,043 B1 * 12/2001 Kikkawa et al. .............. 349/43

(Continued)

*Primary Examiner*—Julie Ngo
(74) *Attorney, Agent, or Firm*—McKenna Long & Aldridge LLP

(57) ABSTRACT

A method of forming an array substrate for use in a liquid crystal display device includes forming a gate line, a gate pad, and a gate electrode, forming a first gate insulating layer to cover the gate line, the gate pad, and the gate electrode, forming an active layer and an ohmic contact layer on the first gate insulating layer, forming a data line, a data pad, a source electrode, and a drain electrode, forming a second insulating layer to cover the thin film transistor, forming a black matrix on the second insulating layer to cover the thin film transistor, the gate line, and the data line except a first portion of the drain electrode, forming a third insulating layer to cover the black matrix, patterning the first, second, and third insulating layers, forming a first transparent electrode layer to cover the patterned third insulating layer, coating an adhesive color film on the first transparent electrode layer, irradiating a laser to portions of the adhesive color film corresponding to the pixel region, removing the adhesive color film to form a color film, repeating coating the adhesive color film, irradiating the laser and removing the adhesive color film to form the color film within all of the pixel regions, forming a second transparent electrode to cover the color filter and the first transparent electrode layer, and patterning the first and second transparent electrode layers to form first and second pixel electrodes, a double-layered gate pad terminal, and a double-layered data pad terminal.

16 Claims, 21 Drawing Sheets

U.S. PATENT DOCUMENTS 6,445,432 B2 * 9/2002 Yamamoto et al. .......... 349/106
2004/0001170 A1 * 1/2004 Chang et al. ................ 349/106
2004/0109101 A1 * 6/2004 Kim et al. .................... 349/44

* cited by examiner

METHOD OF FABRICATING ARRAY SUBSTRATE HAVING COLOR FILTER ON THIN FILM TRANSISTOR STRUCTURE

This application is a divisional of application Ser. No. 10/728,835, filed Dec. 8, 2003 now U.S. Pat. No. 7,130,001, now allowed, which claims priority to Korean Patent Application No. 10-2002-0082727, filed Dec. 23, 2002, each of which are incorporated by reference for all purposes as if fully set forth herein.

The present invention claims the benefit of Korean Patent Application No. P2002-0082727 filed in Korea on Dec. 23, 2002, which is hereby incorporated by reference.

BACKGROUND OF THE INVENTION

1. Field of the Invention

The present invention relates to a display device and a method of fabricating a display device, and more particularly, to an array substrate of a liquid crystal display device and a method of making an array substrate of a liquid crystal display device.

2. Discussion of the Related Art

In general, since flat panel display devices are thin, light weight, and have low power consumption, they are commonly used as displays of portable electronic devices. Among the various types of flat panel display devices, liquid crystal display (LCD) devices are commonly used for laptop computers and desktop computer monitors because of their superior resolution and their ability to produce high quality colored images.

Operation of the LCD devices make use of optical anisotropy and polarization properties of liquid crystal molecules to generate a desired image. The liquid crystal molecules have a specific alignment due to their specific characteristics that can be modified by induced electric fields. For example, the electric fields induced to the liquid crystal molecules can change the alignment of the liquid crystal molecules, and due to the optical anisotropy of the liquid crystal molecules, incident light is refracted according to the alignment of the liquid crystal molecules.

The LCD devices include upper and lower substrates having electrodes that are spaced apart and face into each other, and a liquid crystal material is interposed therebetween. Accordingly, when the electric field is induced to the liquid crystal material through the electrodes of each substrate, an alignment direction of the liquid crystal molecules is changed in accordance with the applied voltage to display images. By controlling the induced voltage, the LCD device provides various light transmittances to display image data.

Among the different types of LCD devices, active matrix LCDs (AM-LCDs) having thin film transistors and pixel electrodes arranged in a matrix form provide high resolution images and superior moving images. A typical LCD panel has an upper substrate, a lower substrate, and a liquid crystal material layer interposed therebetween. The upper substrate, which is commonly referred to as a color filter substrate, includes a common electrode and color filters, and the lower substrate, which is commonly referred to as an array substrate, includes switching elements, such as thin film transistors (TFT's) and pixel electrodes.

FIG. 1 is an expanded perspective view of a liquid crystal display device according to the related art. In FIG. 1, an LCD device 11 includes an upper substrate 5, which is commonly referred to as a color filter substrate, and a lower substrate 22, which is commonly referred to as an array substrate, having a liquid crystal material layer 14 interposed therebetween. A black matrix 6 and a color filter layer 8 are formed in a shape of an array matrix on the upper substrate 5 that includes a plurality of red (R), green (G), and blue (B) color filters surrounded by the black matrix 6. In addition, a common electrode 18 is formed on the upper substrate 5 to cover the color filter layer 8 and the black matrix 6.

A plurality of thin film transistors T are formed in a shape of an array matrix corresponding to the color filter layer 8 on the lower substrate 22, wherein a plurality of crossing gate lines 13 and data lines 15 are perpendicularly positioned such that each TFT T is located adjacent to each intersection of the gate lines 13 and the data lines 15. Furthermore, a plurality of pixel electrodes 17 are formed on a pixel region P defined by the gate lines 13 and the data lines 15 of the lower substrate 22. The pixel electrode 17 includes a transparent conductive material having high transmissivity, such as indium-tin-oxide (ITO) or indium-zinc-oxide (IZO).

In FIG. 1, a storage capacitor C is disposed to correspond to each pixel P and is connected in parallel to each pixel electrode 17. The storage capacitor C comprises a portion of the gate line 13, which functions as a first capacitor electrode, a storage metal layer 30, which functions as a second capacitor electrode, and an interposed insulator 16 (in FIG. 2). Since the storage metal layer 30 is connected to the pixel electrode 17 through a contact hole, the storage capacitor C is electrically contacted to the pixel electrode 17.

Accordingly, a scanning signal is supplied to a gate electrode of the thin film transistor T through the gate line 13, and a data signal is supplied to a source electrode of the thin film transistor T through the data line 15. As a result, liquid crystal molecules of the liquid crystal material layer 14 are aligned and arranged by enablement of the thin film transistor T, and incident light passing through the liquid crystal layer 14 is controlled to display an image. For example, the electric fields induced between the pixel and common electrodes 17 and 18 re-arrange the liquid crystal molecules of the liquid crystal material layer 14 so that the incident light can be controlled to display the desired images in accordance with the induced electric fields.

When fabricating the LCD device 11 of FIG. 1, the upper substrate 5 is aligned with and attached to the lower substrate 22. However, the upper substrate 5 may be misaligned with the lower substrate 22 and light leakage may occur due to a marginal error in attaching the upper and lower substrate 5 and 22.

FIG. 2 is a schematic cross-sectional view along II-II of FIG. 1 showing a pixel of a liquid crystal display device according to the related art. In FIG. 2, the LCD device includes the upper substrate 5, the lower substrate 22, and the liquid crystal layer 14, wherein the upper and lower substrates 5 and 22 are spaced apart from each other, and the liquid crystal layer 14 is interposed therebetween. The thin film transistor T is formed on the front surface of the lower substrate 22 and includes a gate electrode 32, an active layer 34, a source electrode 36, and a drain electrode 38. In addition, a gate insulation layer 16 is interposed between the gate electrode 32 and the active layer 34 to protect the gate electrode 32 and the gate line 13. As shown in FIG. 1, the gate electrode 32 extends from the gate line 13 and the source electrode 36 extends from the data line 15. The gate, source, and drain electrodes 32, 36, and 38 are formed of a metallic material while the active layer 34 is formed of silicon. Furthermore, a passivation layer 40 is formed on the thin film transistor T for protection, wherein the pixel electrode 17 is formed of a transparent conductive material and is disposed on the passivation layer 40 while contacting the drain electrode 38 and the storage metal layer 30.

As previously described, the gate line 13 functions as a first electrode of the storage capacitor C and the storage metal layer 30 functions as a second electrode of the storage capacitor C. Thus, the gate electrode 13 and the storage metal layer 30 constitute the storage capacitor C with the interposed gate insulation layer 16.

In FIG. 2, the upper substrate 5 is spaced apart from the lower substrate 22 over the thin film transistor T. On a rear surface of the upper substrate 5, the black matrix 6 is disposed in positions corresponding to the thin film transistor T, the gate line 13, and the data line 15. For example, the black matrix 6 is formed along an entire surface of the upper substrate 5 and has openings corresponding to the pixel electrode 17 of the lower substrate 22, as shown in FIG. 1. The black matrix 6 prevents light leakage except for portions of the pixel electrode 17 and protects the thin film transistor T from the light, thus preventing generation of photo current in the thin film transistor T. The color filter layer 8 is formed on the rear surface of the upper substrate 5 to cover the black matrix 6 and includes red 8a, green 8b, and blue 8c colors filters, each corresponding to one pixel region P where the pixel electrode 17 is located. In addition, a common electrode 18 formed of a transparent conductive material is disposed on the color filter layer 8 over the upper substrate 5.

In FIG. 2, the pixel electrode 17 has a one-to-one correspondence with one of the color filters 8a, 8b, and 8c. Furthermore, in order to prevent a cross-talk between the pixel electrode 17 and the gate and data lines 13 and 15, the pixel electrode 17 is spaced apart from the data line 15 by a distance A and from the gate line 13 by a distance B. Accordingly, open spaces within the distances A and B between the pixel electrode 17 and the data and gate line 15 and 13 cause light leakage in the LCD device. For example, the light leakage mainly occurs within the open spaces A and B so that the black matrix 6 formed on the upper substrate 5 should cover those open spaces A and B. However, when arranging the upper substrate 5 with the lower substrate 22 or vice versa, a misalignment may occur between the upper substrate 5 and the lower substrate 22. Thus, the black matrix 6 is extended to fully cover those open spaces A and B to provide an aligning margin to prevent light leakage. However, by extending the black matrix, an aperture ratio of the liquid crystal panel is reduced as much as the aligning margin of the black matrix 6. Moreover, if there are errors in the aligning margin of the black matrix 6, the light leakage still occurs in the open spaces A and B, and deteriorates the image quality of the LCD device.

SUMMARY OF THE INVENTION

Accordingly, the present invention is directed to an array substrate of a liquid crystal display device and a method of fabricating an array substrate that substantially obviates one or more of the problems due to limitations and disadvantages of the related art.

An object of the present invention is to provide a method of fabricating an array substrate for a liquid crystal display device that provides a high aperture ratio.

Another object of the present invention is to provide a method of forming an array substrate for a liquid crystal display device having simplified and stabilized fabricating processes to increase manufacturing yield.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of forming an array substrate for use in a liquid crystal display device includes forming a gate line on a substrate along a first direction, a gate pad at one end of the gate line, and a gate electrode extending from the gate line, forming a first gate insulating layer on the substrate to cover the gate line, the gate pad, and the gate electrode, forming an active layer of intrinsic amorphous silicon and an ohmic contact layer of extrinsic amorphous silicon layer sequentially on the first gate insulating layer over the gate electrode, forming a data line, a data pad, a source electrode, and a drain electrode, the data line disposed extending along a second direction to perpendicularly cross the gate line to define a pixel region, the data pad disposed at one end of the data line, the source electrode extending from the data line on a first portion of the ohmic contact layer, and the drain electrode spaced apart from the source electrode on a second portion of the ohmic contact layer to form a thin film transistor, forming a second insulating layer over an entire surface of the substrate to cover the thin film transistor, forming a black matrix on the second insulating layer to cover the thin film transistor, the gate line, and the data line except a first portion of the drain electrode, forming a third insulating layer over an entire surface of the substrate to cover the black matrix, patterning the first, second, and third insulating layers to expose the first portion of drain electrode, to form a gate pad contact hole exposing the gate pad, and to form a data pad contact hole exposing the data pad, forming a first transparent electrode layer over an entire surface of the substrate to cover the patterned third insulating layer and contacting the exposed first portion of the drain electrode, coating an adhesive color film on the first transparent electrode layer, the adhesive color film having a color resin on a surface facing the first transparent electrode layer, irradiating a laser to portions of the adhesive color film corresponding to the pixel region, removing the adhesive color film after irradiating the laser to form a color film within the pixel region wherein the laser is irradiated, repeating coating the adhesive color film, irradiating the laser and removing the adhesive color film to form the color film within all of the pixel regions, forming a second transparent electrode layer over an entire surface of the substrate to cover the color filter and the first transparent electrode layer, and patterning the first and second transparent electrode layers to form first and second pixel electrodes, a double-layered gate pad terminal, and a double-layered data pad terminal.

In another aspect, a method of forming an array substrate device for use in a liquid crystal display device includes forming a gate line on a substrate along a first direction, the gate line including a gate pad at one end thereof, forming a first insulating layer on the substrate to cover the gate line, forming a data line over the first insulating layer along a second direction perpendicular to the first direction on the substrate, the data line defining a pixel region with the gate line and including a data pad at one end thereof, forming a thin film transistor at a crossing region of the gate and data lines, the thin film transistor including a gate electrode, a semiconductor layer, a source electrode, and a drain electrode, forming a black matrix overlapping the thin film transistor, the gate line, and the data line except a first portion of the drain electrode, forming a second insulating layer over an entire surface of the substrate to cover the black matrix, patterning the first and second insulating layers to expose the first portion of drain electrode, to form a gate pad contact hole exposing the gate pad, and to form a data pad contact hole exposing the data pad, forming a first transparent electrode layer over an entire surface of the substrate to cover the patterned second insulating layer and contacting the exposed first portion of the drain electrode, dropping a liquid-type color resin onto the first transparent electrode layer within the pixel region to form a color filter within the pixel region, forming a second transparent electrode layer over an entire surface of the substrate to cover the color filter and the first transparent electrode layer, and patterning the first and second transparent electrode layers to form first and second pixel electrodes, a double-layered gate pad terminal, and a double-layered data pad terminal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the illustrated embodiments of the present invention, examples of which are illustrated in the accompanying drawings. Wherever possible, the same reference number will be used throughout the drawings to refer to the same or like parts.

Figure 1:
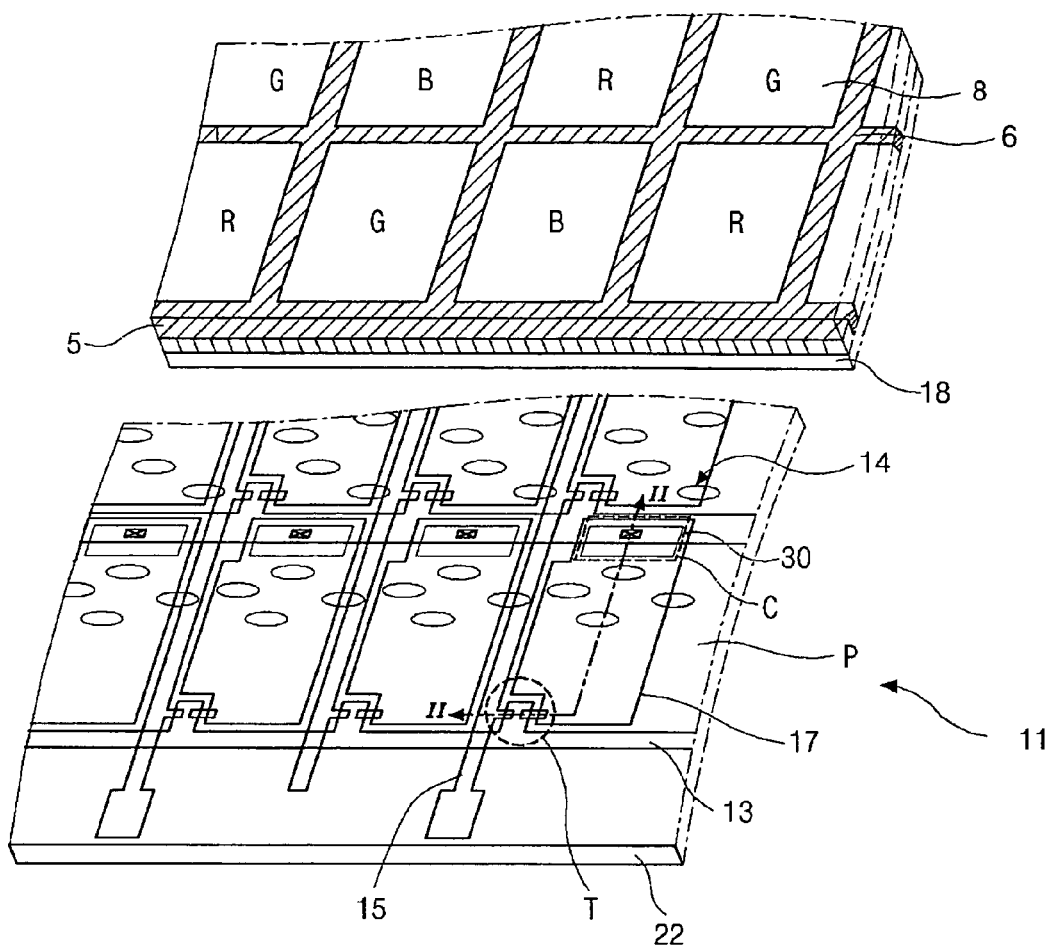
FIG. 1 is an expanded perspective view of a liquid crystal display device according to the related art.
Figure 2:
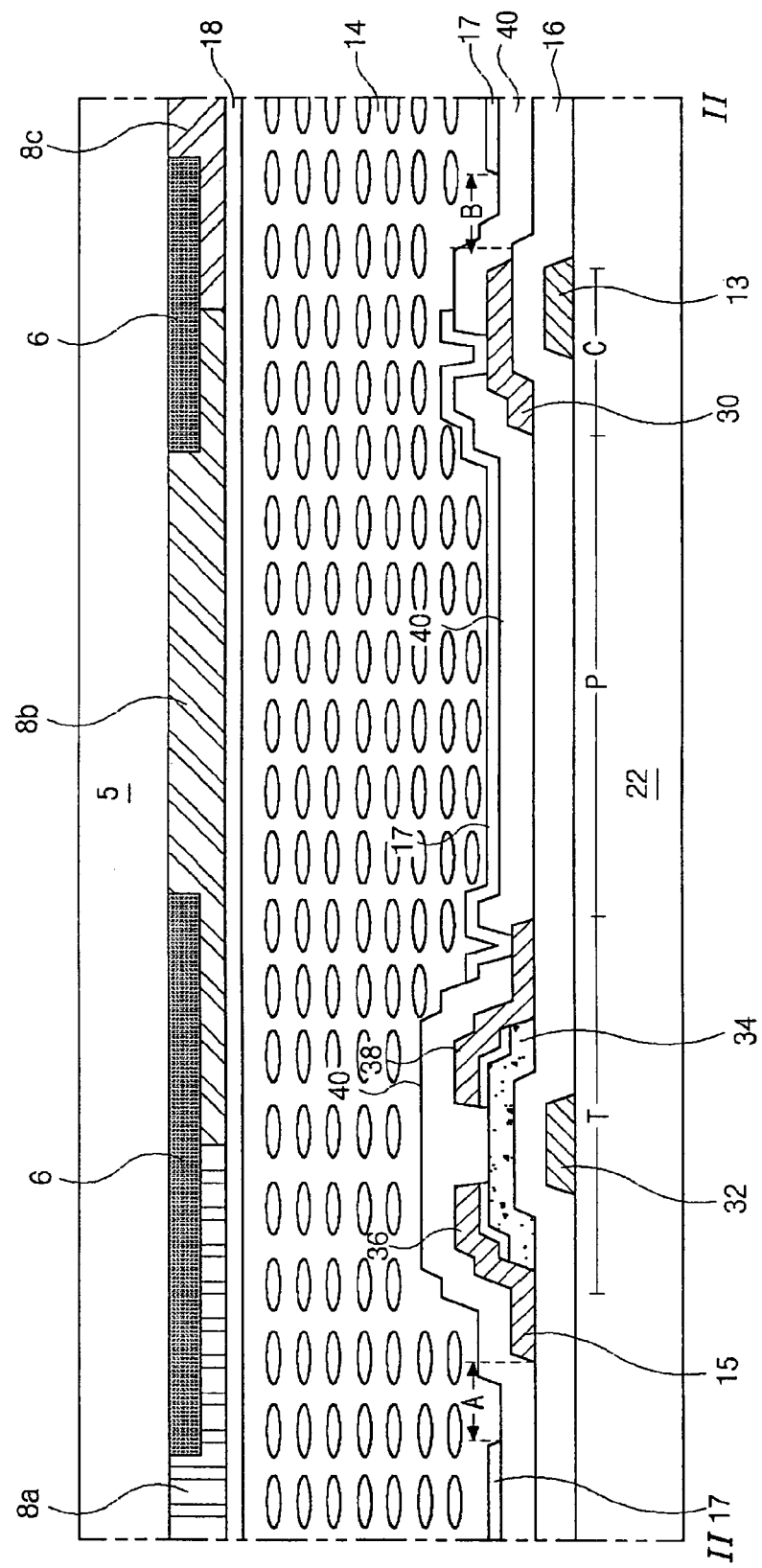
FIG. 2 is a schematic cross-sectional view along II-II of FIG. 1 showing a pixel of a liquid crystal display device according to the related art.
Figure 3:
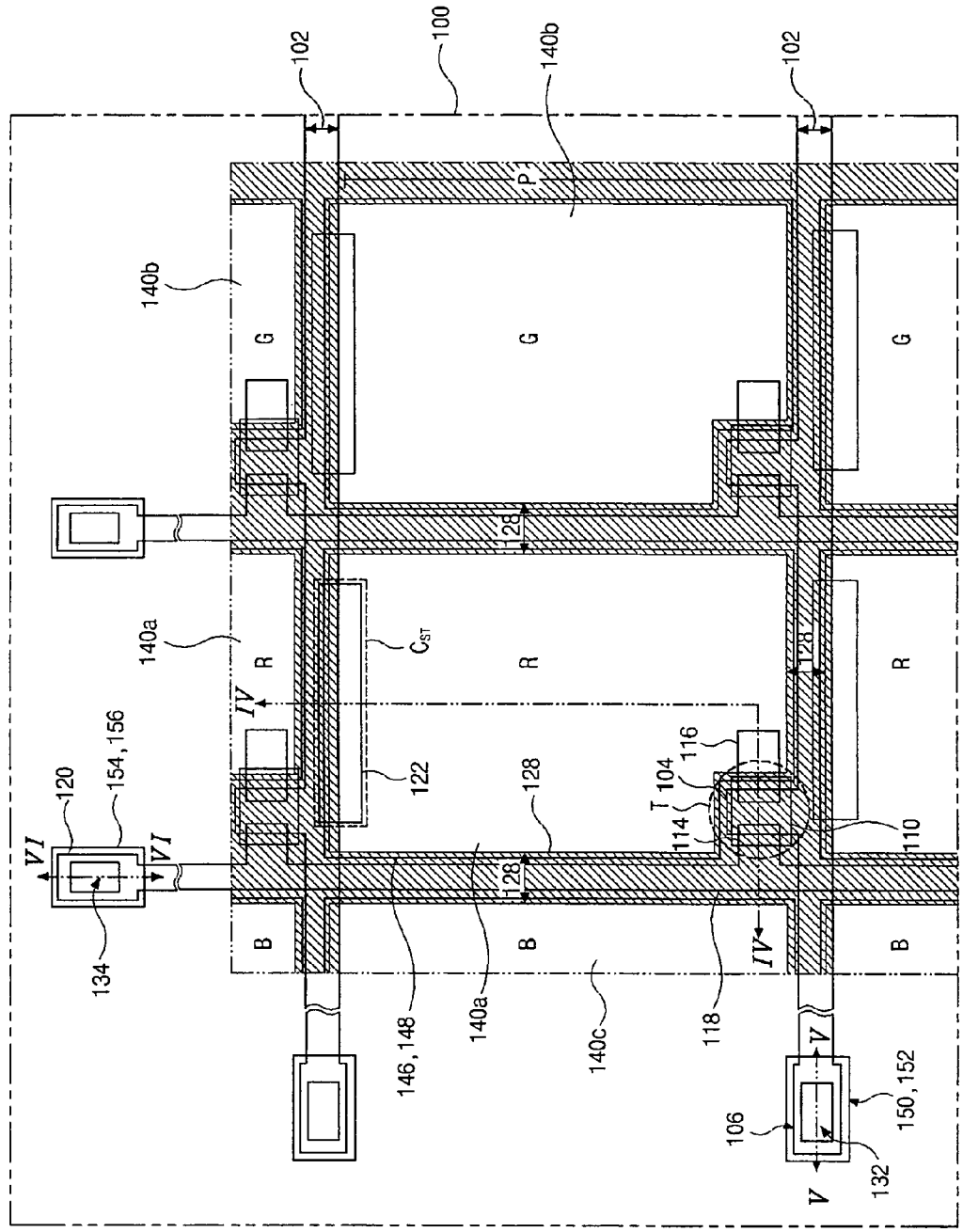
FIG. 3 is a partially enlarged plan view of an exemplary array substrate according to the present invention.

FIG. 3 is a partially enlarged plan view of an exemplary array substrate according to the present invention. In FIG. 3, an array substrate 100 may include a plurality of gate lines 102 disposed along a transverse direction and a plurality of data lines 118 disposed along a longitudinal direction, wherein the plurality of gate lines 102 and the plurality of data lines 118 cross one another to define a pixel region P. Each gate line 102 and each data line 118 may include a gate pad 106 and a data pad 120, respectively, disposed at ends of each gate line 102 and at ends of each data line 118. Over the gate pad 106, is disposed a double-layered gate pad terminal having first and second gate pads 150 and 152. Over the data pad 120, is disposed a double-layered data pad terminal having first and second data pads 154 and 156. In addition, a thin film transistor T may be formed at each crossing portion of the gate line 102 and the data line 118, and may include a gate electrode 104, an active layer 110, a source electrode 114, and a drain electrode 116.

Within the pixel regions P defined by the plurality of gate lines and data lines 102 and 118, a plurality of red (R), green (G), and blue (B) color filters 140a, 140b, and 140c may be located therein. In addition, a double-layered pixel electrode structure including first and second pixel electrodes 146 and 148 may be disposed corresponding to each pixel region P. The first pixel electrode 146 and the second pixel electrode 148 may have similar shapes. Alternatively, the first pixel electrode 146 and the second pixel electrode 148 may have dissimilar shapes. Although not shown, the first pixel electrode 146 may be disposed beneath the color filter 140 and may contact the drain electrode 116, and the second pixel electrode 148 may be disposed on the color filter 140 and may contact the first pixel electrode 146. Accordingly, the color filter 140 may be located between the first and second pixel electrodes 146 and 148, and the second pixel electrode 148 may electrically contact the drain electrode 116 through the first pixel electrode 146.

In FIG. 3, a storage capacitor CST may be provided within a portion of the gate line 102 and a storage metal layer 122. Accordingly, the portion of the gate line 102 may function as a first electrode of the storage capacitor $C_{ST}$, and the storage metal layer 122 may function as a second electrode of the storage capacitor $C_{ST}$. In addition, the first and second pixel electrodes 146 and 148 may electrically contact the storage metal layer 122 such that they may be electrically connected to the storage capacitor $C_{ST}$ in parallel.

In FIG. 3, the array substrate 100 may include a color filter-on-thin film transistor (COT) structure. In such a COT structure, a black matrix 128 and the color filters 134 may be formed on the array substrate 100. The black matrix 128 may be disposed to correspond to the thin film transistors T, the gate lines 102, and the data lines 118 to prevent light leakage in the LCD device. The black matrix 128 may be formed of an opaque organic material, thereby blocking the light incident to the thin film transistors T and protecting the thin film transistors T from external impact. In the present invention, the color filters 140 may be formed by a thermal imaging method where a color film adheres to the array substrate to become a color filter. Alternatively, an inkjet method is used to form the color filters 140. Those methods will be explained later in this specification.

In FIG. 3, a gate pad contact hole 132 and a data pad contact hole 134 may be provided to expose the gate pad 106 and the data pad 120, respectively. A process for forming the gate and data pad contact holes 132 and 134 may be performed before formation of the double-layer structure of the pixel electrodes 146 and 148 and the color filters 140.

FIGS. 4A-4G are cross-sectional views along IV-IV of FIG. 3 showing exemplary fabrication process steps according to the present invention, FIGS. 5A-5G are cross sectional views along V-V of FIG. 3 showing exemplary fabrication process steps according to the present invention, and FIGS. 6A-6G are cross sectional views along VI-VI of FIG. 3 showing exemplary fabrication process steps according to the present invention.

Figure 4A:
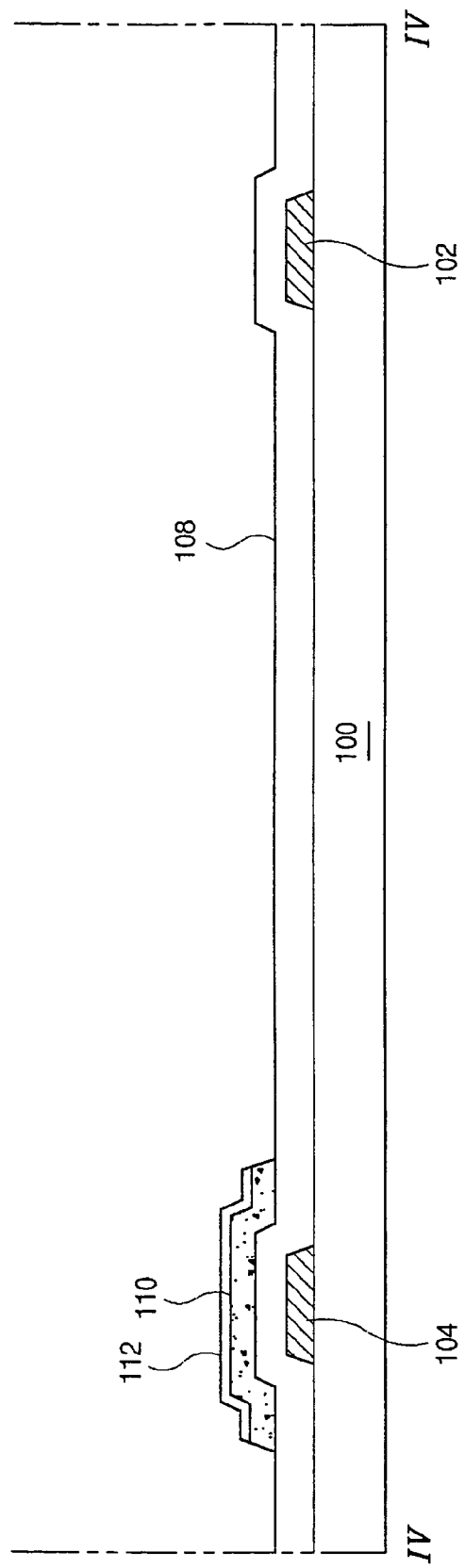
FIGS. 4A-4G are cross-sectional views along IV-IV of FIG. 3 showing exemplary fabrication process steps according to the present invention.
Figure 5A:
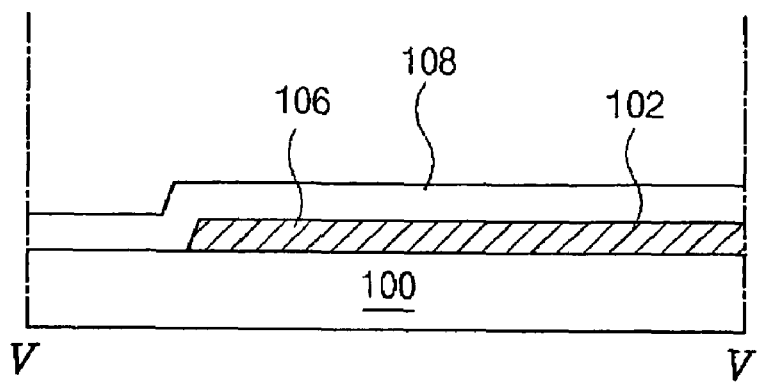
FIGS. 5A-5G are cross sectional views along V-V of FIG. 3 showing exemplary fabrication process steps according to the present invention.
Figure 6A:
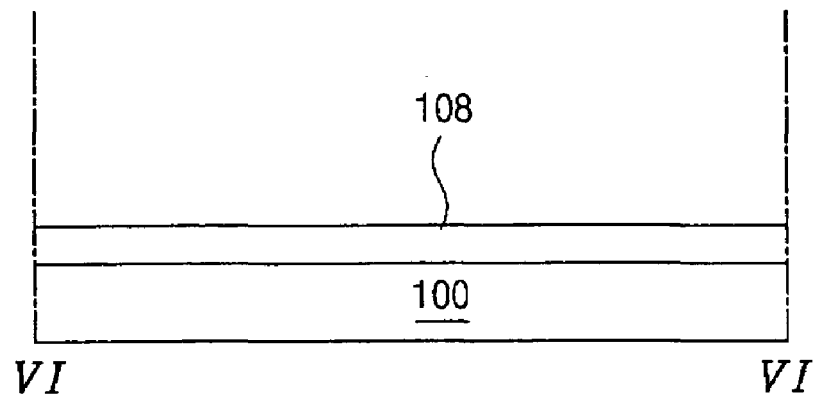
FIGS. 6A-6G are cross sectional views along VI-VI of FIG. 3 showing exemplary fabrication process steps according to the present invention.

In FIGS. 4A, 5A, and 6A, a first metal layer may be deposited onto a surface of a substrate 100, and then patterned using a mask process to form a gate line 102, a gate electrode 104, and a gate pad 106. As mentioned before, the gate pad 106 may be disposed at the end of the gate line 102, and the gate electrode 104 may extend from the gate line 102. The first metal layer may include aluminum-based material(s) having low electrical resistance in order to prevent signal delay.

After formation of the gate line 102, the gate electrode 104, and the gate pad 106 on the substrate 100, a gate insulation layer 108 (or a first insulating layer) may be formed on the substrate 100 to cover the gate line 102, the gate electrode 104, and the gate pad 106. The gate insulation layer 108 may include inorganic material(s), such as silicon nitride ($SiN_x$) and silicon oxide ($SiO_2$). Then, an intrinsic amorphous silicon layer (e.g., a-Si:H) and a doped amorphous silicon layer (e.g., $n^+$a-Si:H) may be sequentially deposited along an entire surface of the gate insulation layer 108, and may be simultaneously patterned using a mask process to form an active layer 110 and an ohmic contact layer 112. The ohmic contact layer 112 may be located on the active layer 110 over the gate electrode 104.

Figure 4B:
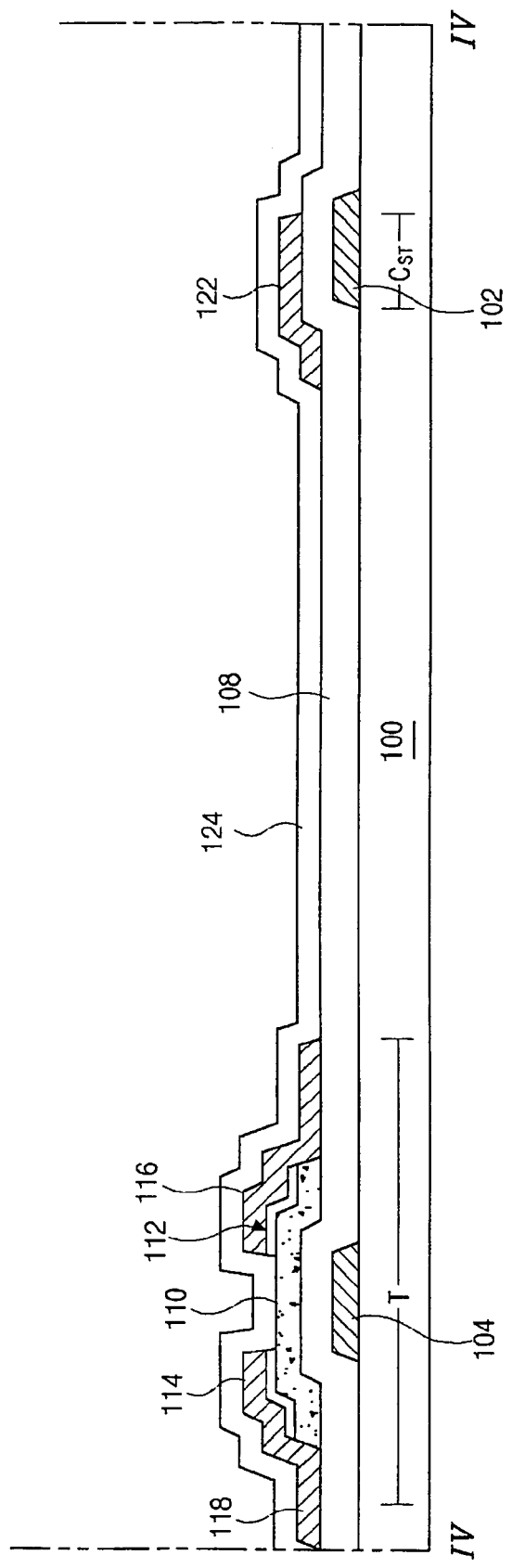
Figure 5B:
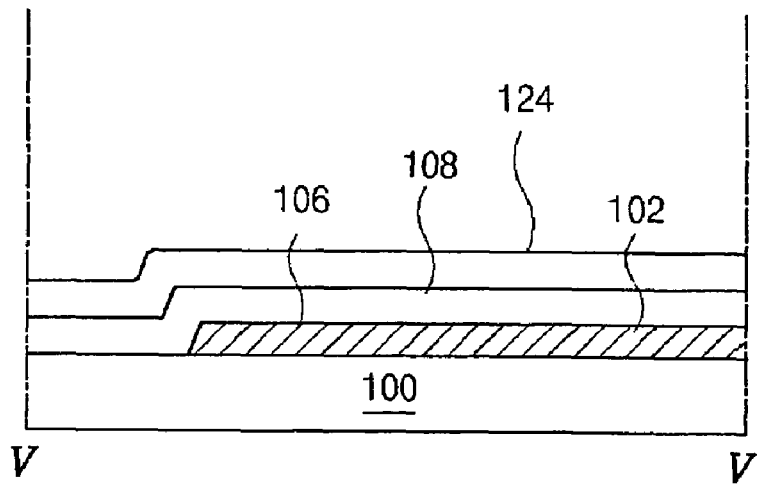
Figure 6B:
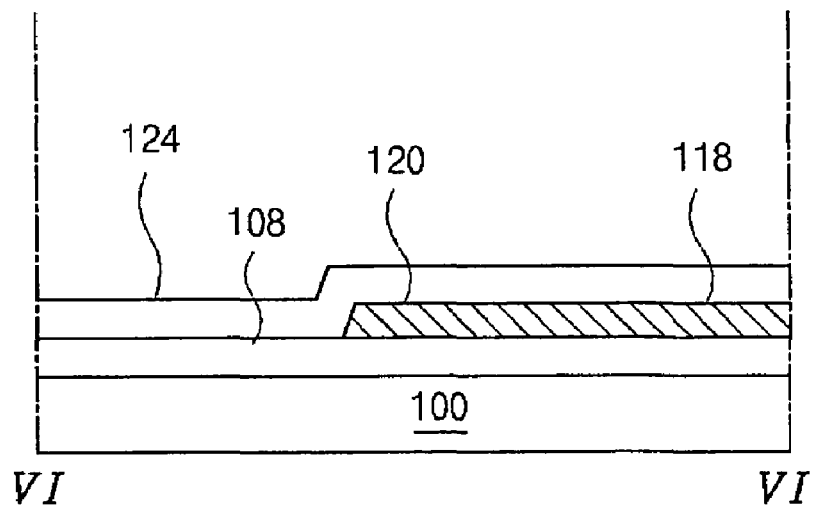

In FIGS. 4B, 5B, and 6B, after forming the active layer 110 and the ohmic contact layer 112, a second metal layer may be deposited over the substrate 100, and then patterned using a mask process to form a source electrode 114, a drain electrode 116, a data line 118, a storage metal layer 122, and a data pad 120. The second metal layer may include at least one of chromium (Cr), molybdenum (Mo), tungsten (W), titanium (Ti), copper (Cu), and an alloy of any combination thereof. The source electrode 114 may extend from the data line 118 and may contact one portion of the ohmic contact layer 112. The drain electrode 116 may be spaced apart from the source electrode 114 and may contact another portion of the ohmic contact layer 112. In addition, the storage metal layer 122 may overlap a portion of the gate line 102, and the data pad 120 may be connected to the data line 118 at the end of the data line 118.

Next, a portion of the ohmic contact layer 112 located between the source and drain electrodes 114 and 116 may be etched using the source and drain electrodes 114 and 116 as masks. Accordingly, a thin film transistor T and a storage capacitor $C_{ST}$ (in FIG. 3) may be formed, wherein the thin film transistor T may include the gate electrode 104, the active layer 110, the ohmic contact layer 112, the source electrode 114, and the drain electrode 116, and the storage capacitor $C_{ST}$ (in FIG. 3) may include of the gate line 102, the storage metal layer 122, and the interposed first insulating layer 108.

Then, a second insulating layer 124 may be deposited along an entire surface of the substrate 100 to cover the patterned second metal layer. The second insulating layer 124 may be formed of silicon nitride ($SiN_x$) or silicon oxide ($SiO_2$) and may enhance adhesion of an organic layer to be subsequently formed. The second insulating layer 124 prevents insufficient contact between the active layer 110 and the subsequently-formed organic layer. However, if contact between the active layer 110 and the subsequently-formed organic layer is sufficient, the second insulating layer 124 may not be necessary.

Figure 4C:
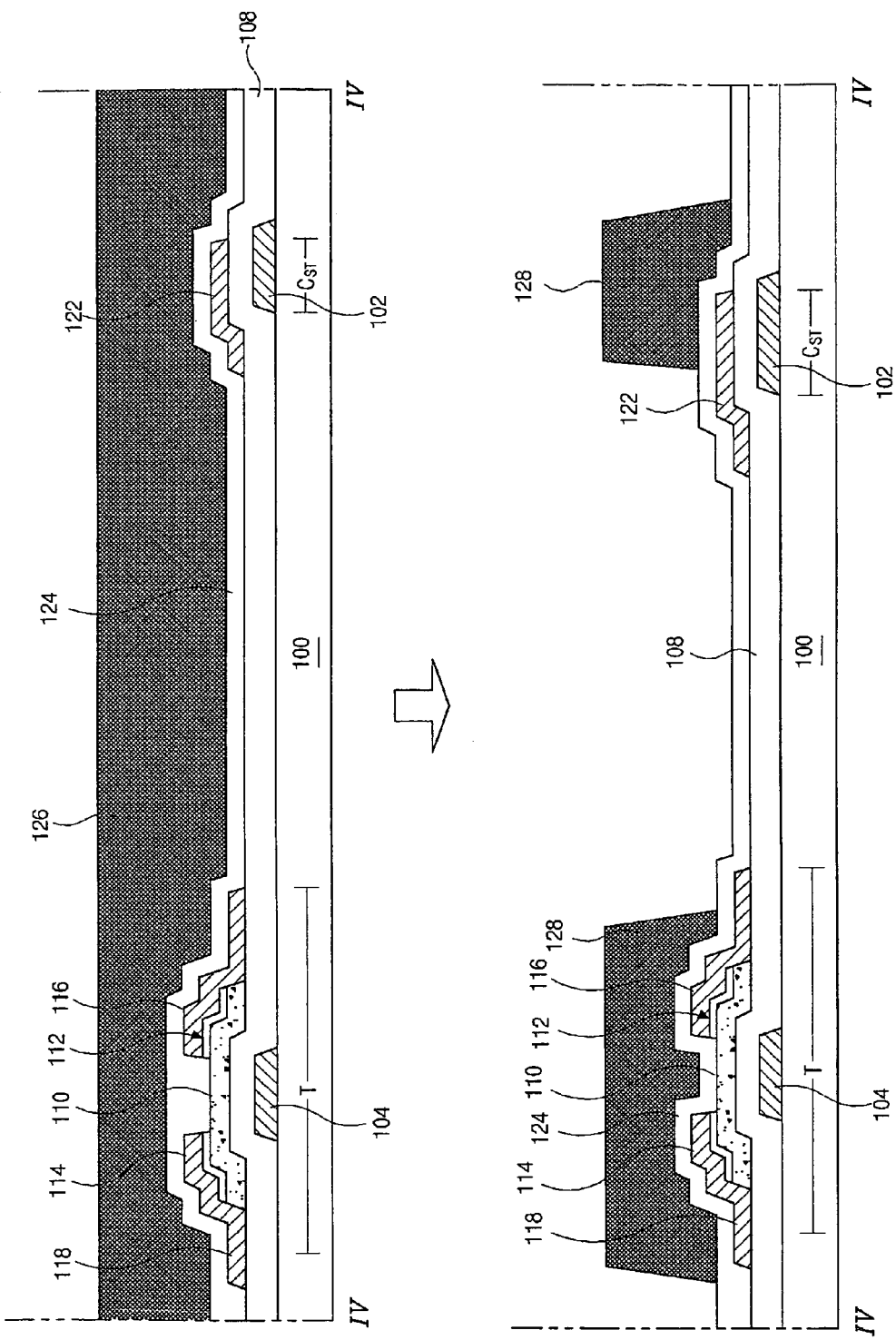
Figure 5C:
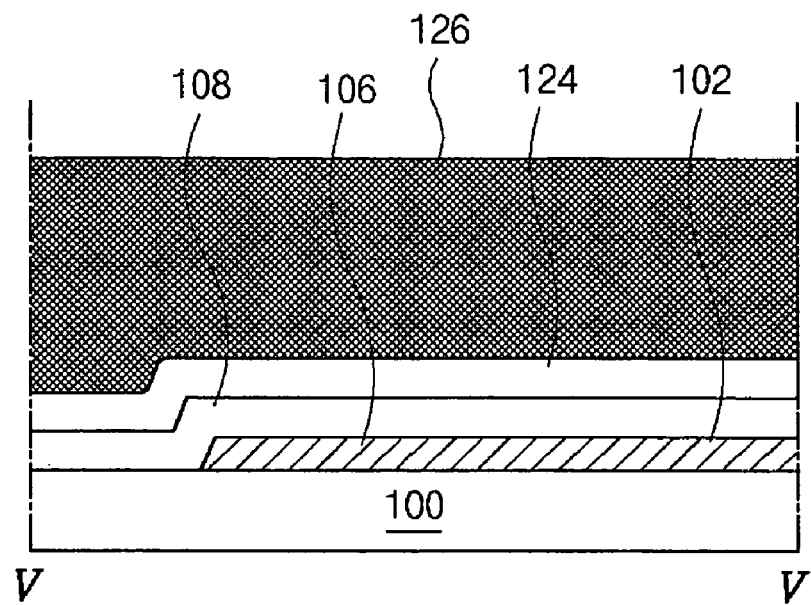
Figure 5C:
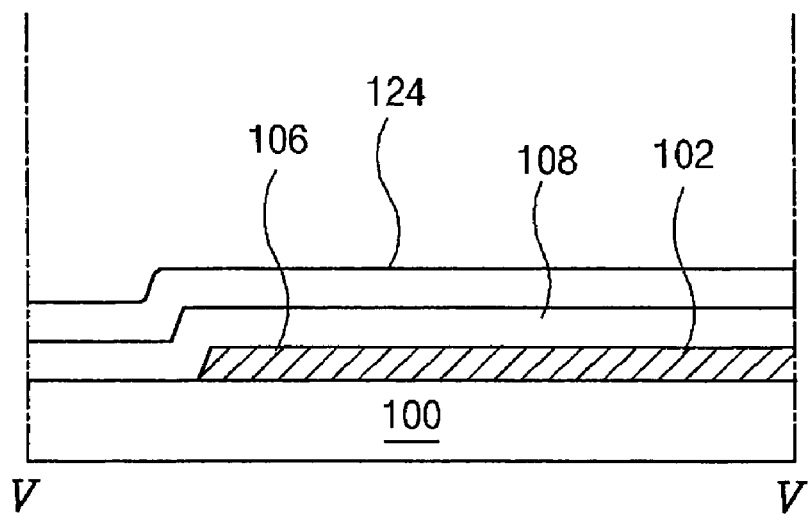
Figure 6C:
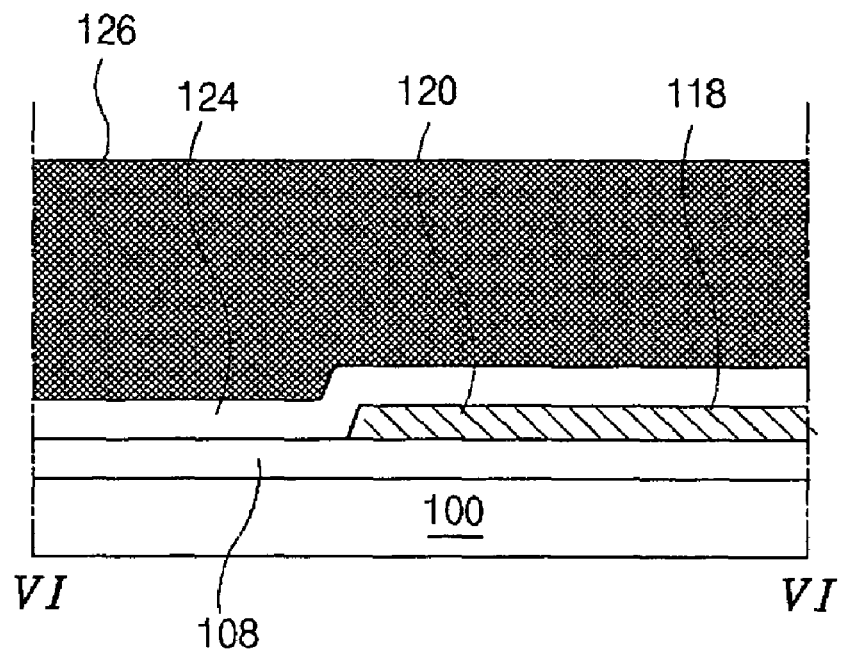
Figure 6C:
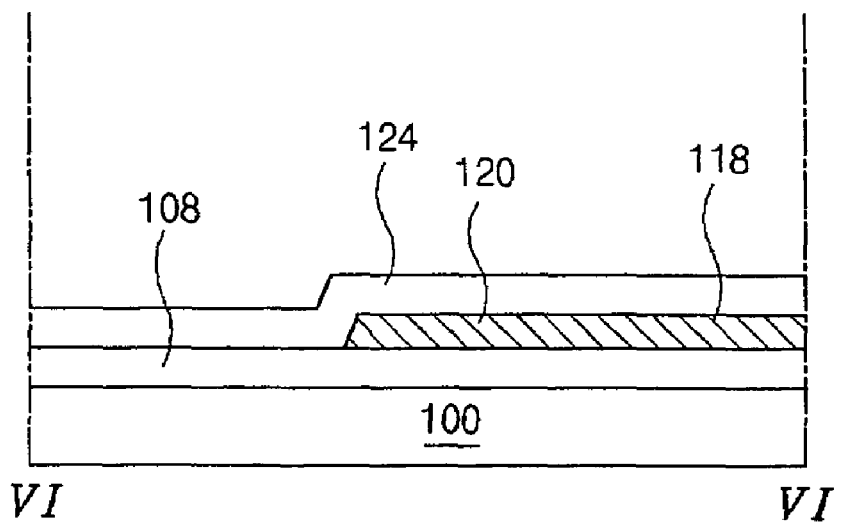

In FIGS. 4C, 5C, and 6C, an opaque organic material 126 having a low dielectric constant may be deposited on the second insulating layer 124, wherein the opaque organic material 126 may have a black color to function as a black matrix. Then, the opaque organic material 126 formed on the second insulating layer 124 may be patterned using a mask process. Accordingly, a black matrix 128 may be formed over the thin film transistor T, the data line 118, and the gate line 102 that are disposed in a display area. Since the black matrix 128 includes organic material(s), it may provide protection to the thin film transistor T. In addition, the black matrix 128 may cover a portion of the storage metal layer 122, thereby protecting the storage capacitor $C_{ST}$ (in FIG. 3).

Figure 4D:
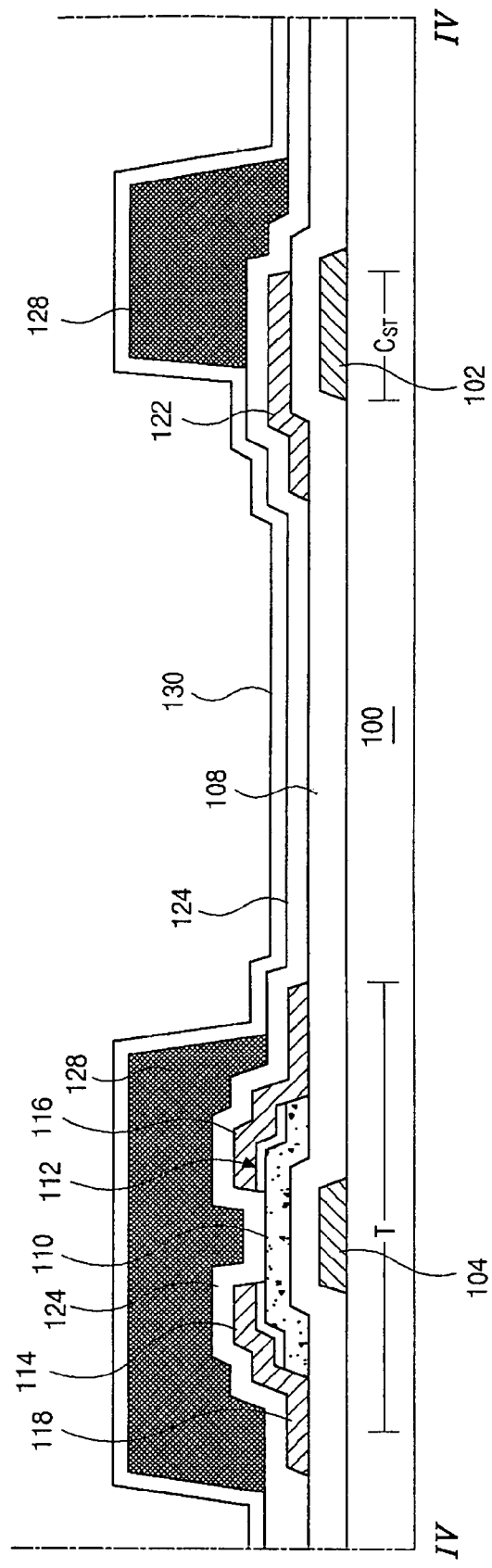
Figure 5D:
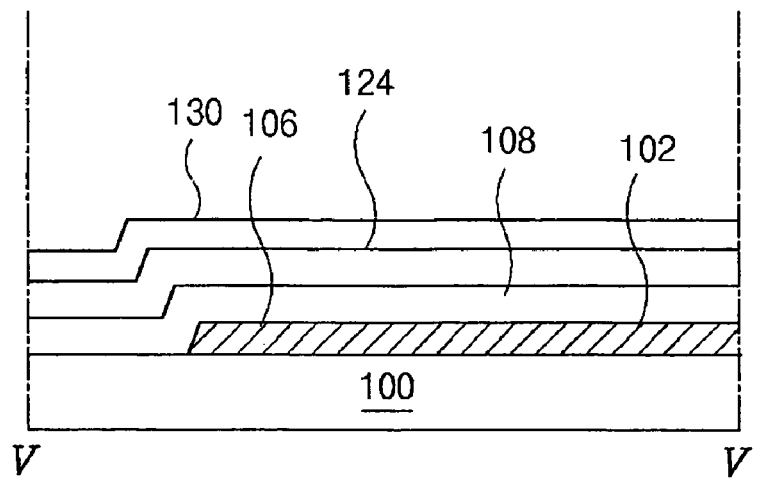
Figure 6D:
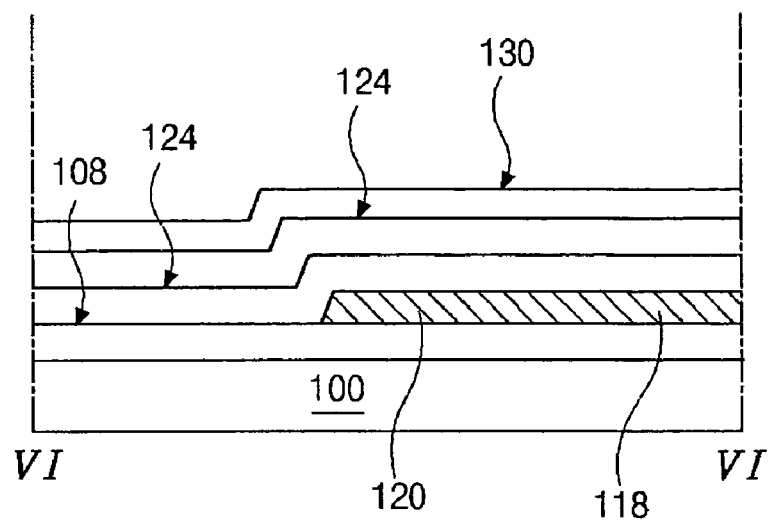

In FIGS. 4D, 5D, and 6D, a third insulating layer 130 may be formed along an entire surface of the substrate 100 to cover the black matrix 128. The third insulating layer 130 may include inorganic insulating material(s), such as silicon nitride ($SiN_x$) or silicon oxide ($SiO_2$).

Figure 4E:
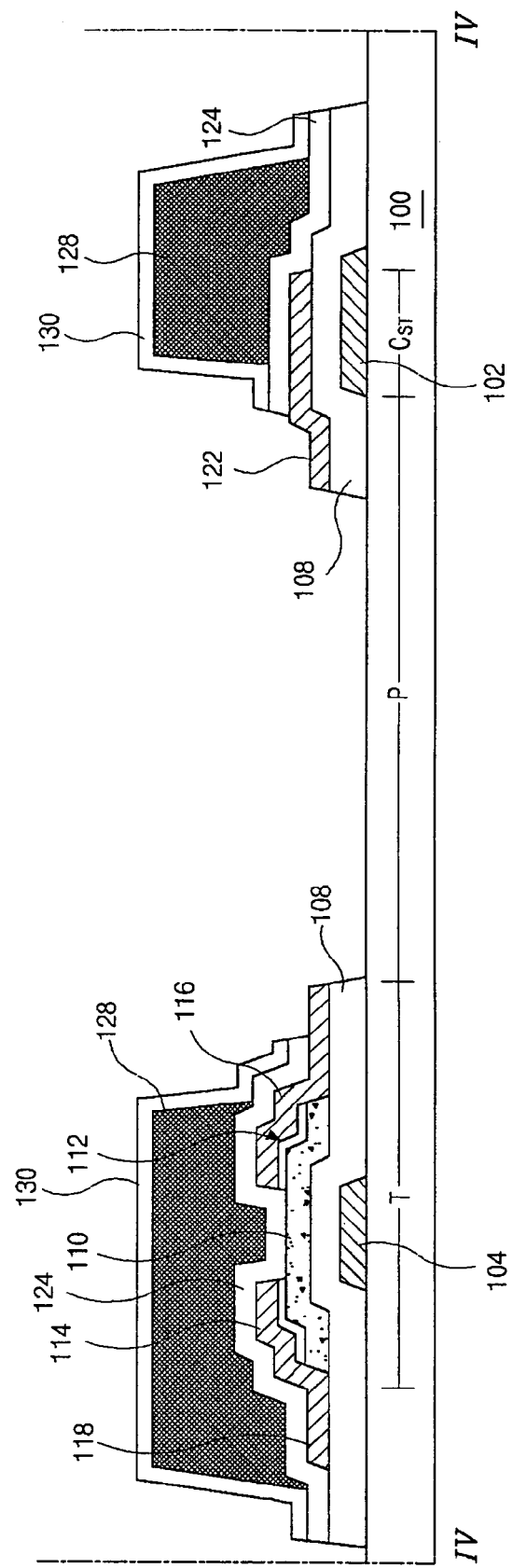
Figure 5E:
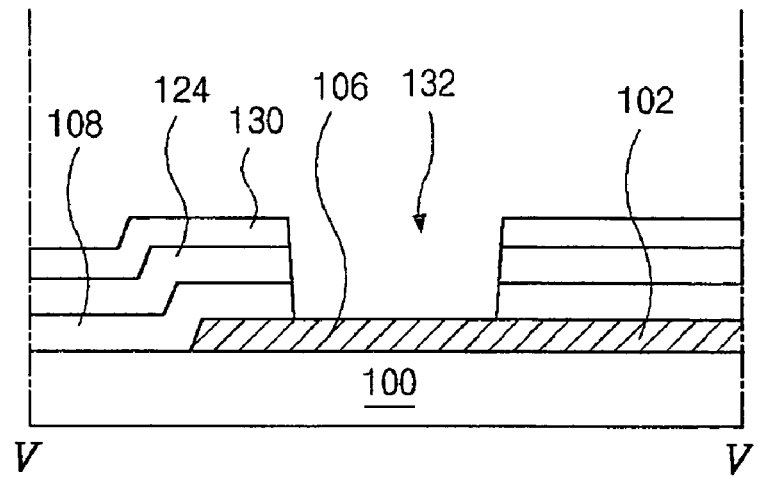
Figure 6E:
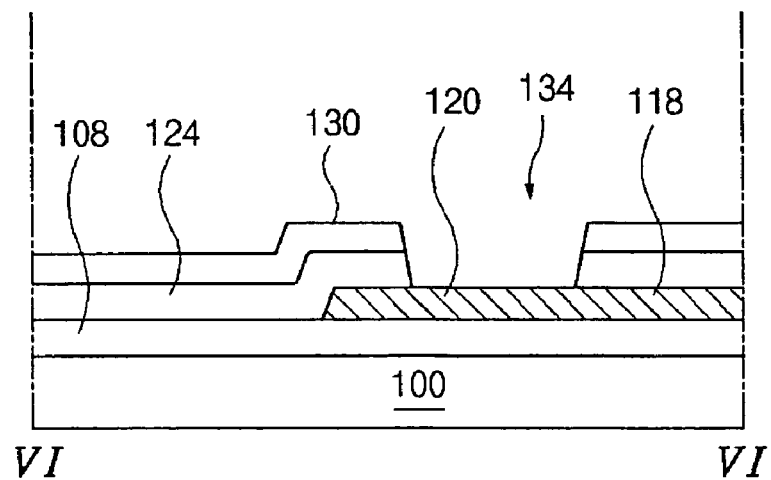

In FIGS. 4E, 5E, and 6E, the first, second, and third insulating layers 108, 124 and 130 may be simultaneously patterned within the pixel region P using a mask process. Accordingly, an end side portion of the drain electrode 106 and an end side portion of the storage metal layer 122 may be exposed. Although FIG. 4E shows that the substrate 100 may be exposed by patterning the first insulating layer 108, the first insulating layer 108 may remain and only the second and third insulating layers 124 and 130 may be patterned to expose the side portions of the drain electrode 106 and storage metal layer 122. Furthermore, remaining portions of the first insulating layer 108 on the substrate 100 may control a height of a subsequently-formed color filter. During patterning of the first, second, and third insulating layers 108, 124, and 130 in the pixel region P, portions of the first, second, and third insulating layers 108, 124, and 130 may be patterned so that the gate pad contact hole 132 and the data pad contact hole 134 are formed to expose the gate and data pads 106 and 120, as shown in FIGS. 5E and 6E.

Figure 4F:
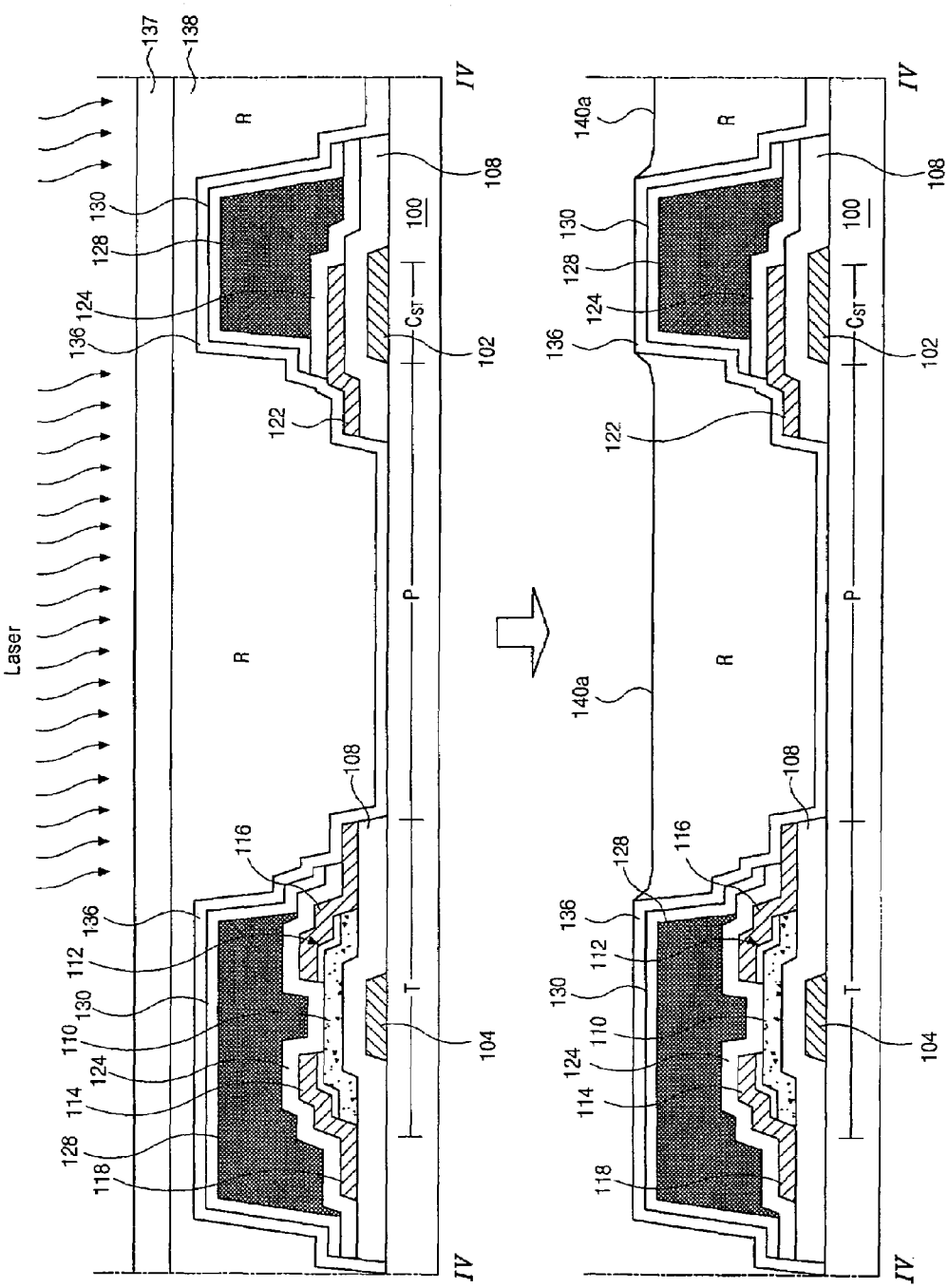
Figure 5F:
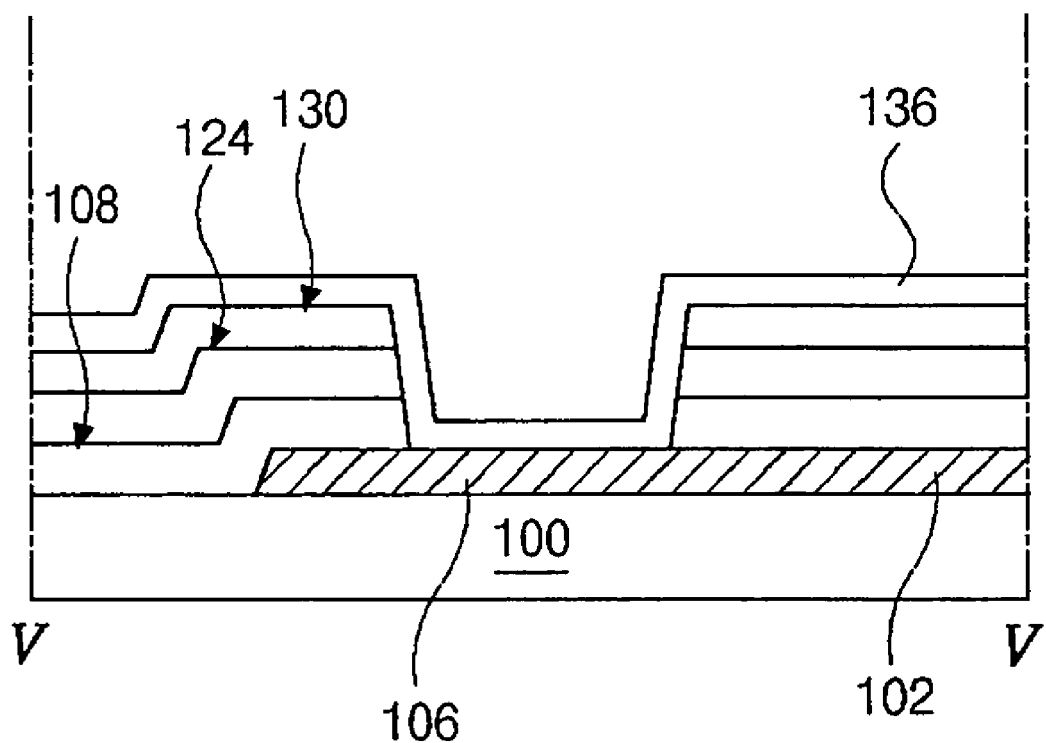
Figure 6F:
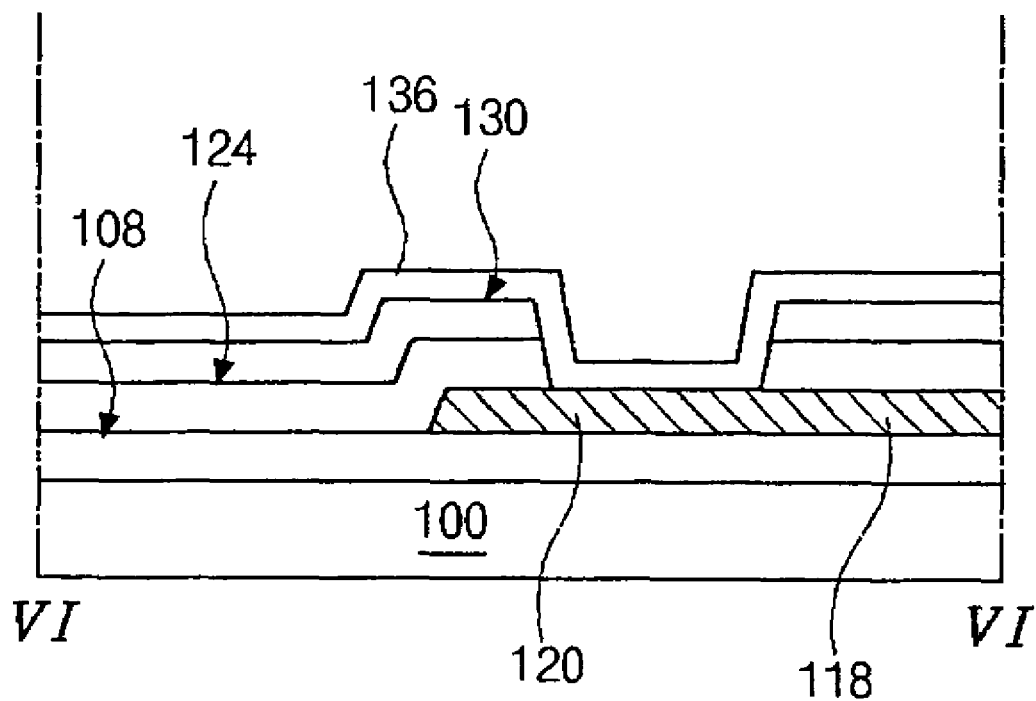

In FIGS. 4F, 5F and 6F, a first transparent electrode layer 136 may be formed by depositing at least one of indium tin oxide (ITO) and indium zinc oxide (IZO) along an entire surface of the substrate 100 to cover the patterned third insulating layer 130 and to contact the exposed side portions of the drain electrode 106 and storage metal layer 122. Next, an adhesive color film 137, upon which a red color resin 138 may be coated, may be adhered to the first transparent electrode layer 136, and may include a material capable of converting light energy into thermal energy. Then, the color resin 138 may cured by the thermal energy during a laser irradiation process.

For example, as shown in FIG. 4F, the adhesive color film 137 having the color resin 138 thereon may be first disposed on the first transparent electrode layer 136, and then partially irradiated with a laser, especially portions that correspond to the pixel region P. Accordingly, the irradiated portions of the adhesive color film 137 may convert the laser energy into the thermal energy, and the desired portions of the color film 138 may be cured by the thermal energy and may be adhered to the first transparent electrode layer 136.

After the laser irradiation process, the color film 137 may be removed from the substrate 100 so that the desired color films 140a remain in regions corresponding to the desired pixel regions P. The laser may be an infrared ray or a visible ray (300-1500 nm) laser, and may be a solid, semiconductor, or gas laser. The energy density of the laser may range from about 0.01 mJ/cm² to about 10 mJ/cm² in order to transcribe the pigment in the color film 138 onto the glass substrate 100. This method of forming the color filter films 140a is referred to as a thermal imaging method. Repetition of the above-described thermal imaging method may be used to form each of the color filters 140a, 140b, and 140c, respectively, as shown in FIG. 3, wherein each of the color filters 140a, 140b, and 140c correspond to each of the pixel regions P (in FIG. 3).

Figure 4G:
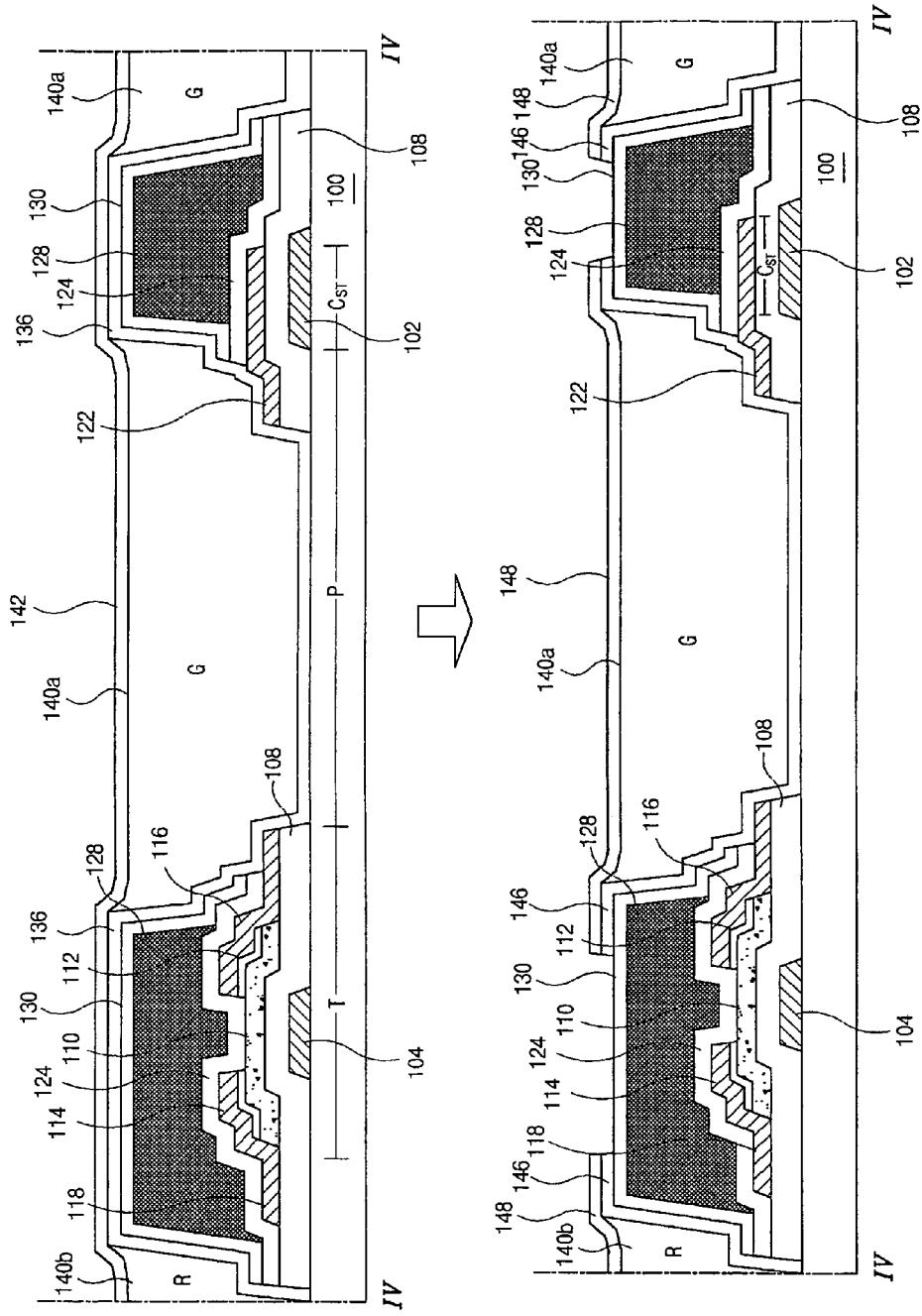
Figure 5G:
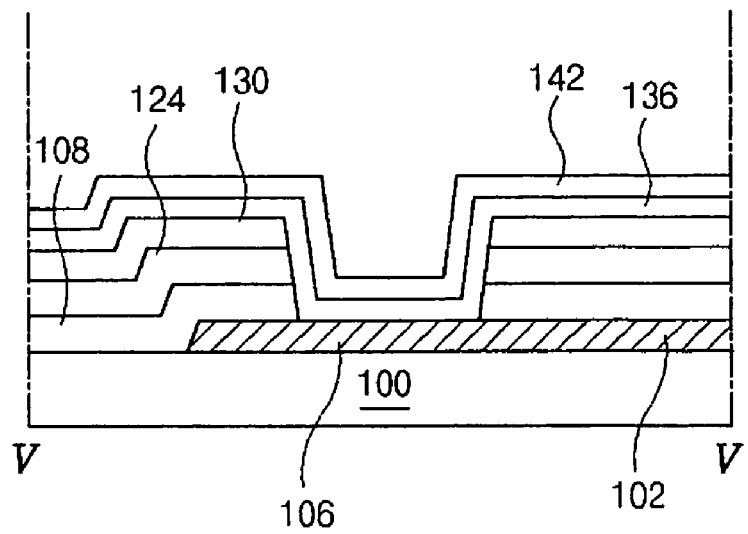
Figure 5G:
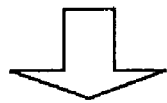
Figure 5G:
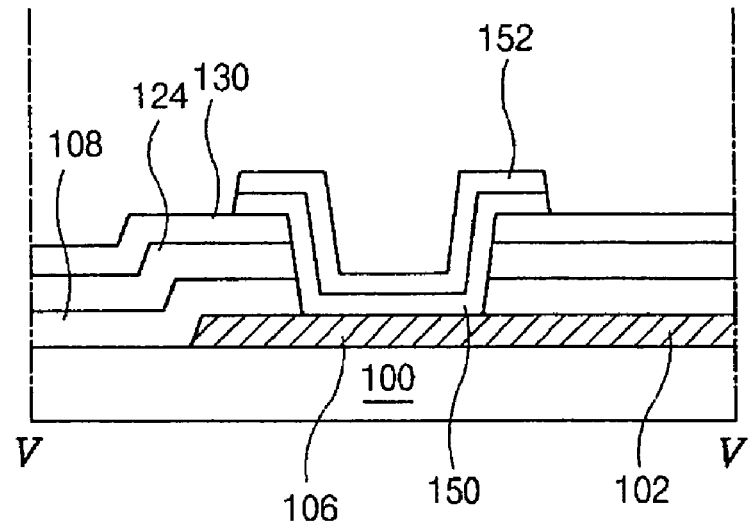
Figure 6G:
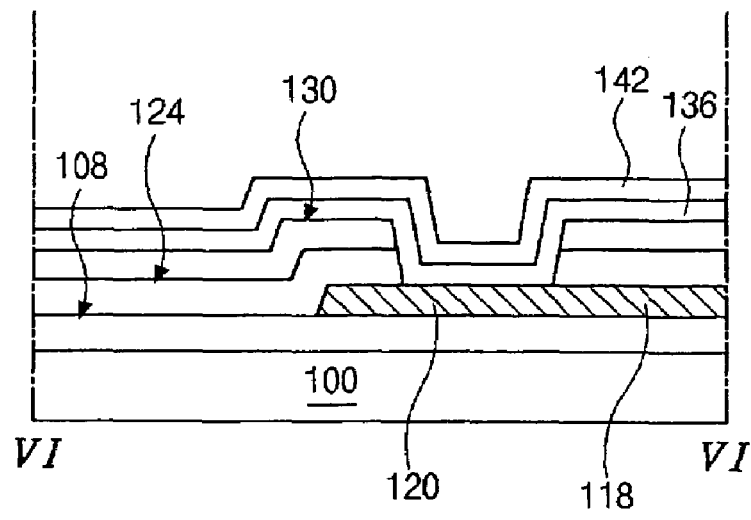
Figure 6G:
Figure 6G:
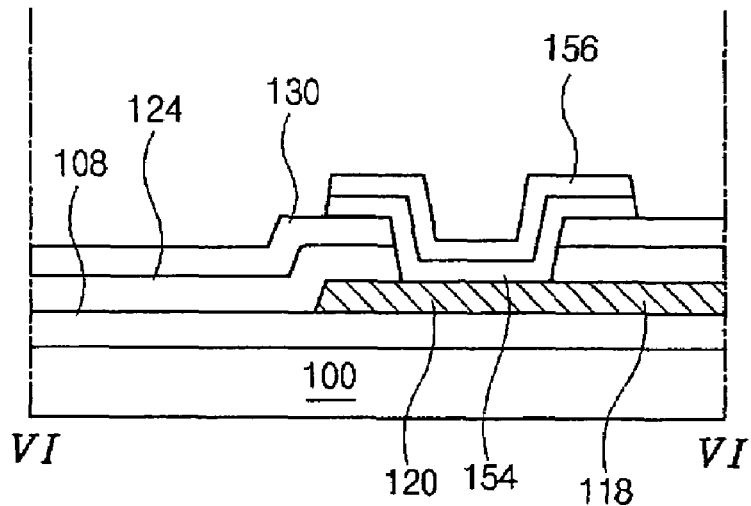

In FIGS. 4G, 5G and 6G, after forming each of the color filters 140a, 140b, and 140c, a second transparent layer 142 may be formed along an entire surface of the substrate 100 to contact each of the color filters 140a, 140b, and 140c and the exposed portions of the first transparent electrode layer 136. The second transparent electrode layer 142 may include at least one of indium tin oxide and indium zinc oxide similar to the first transparent electrode layer 136. In FIG. 4G, the second transparent electrode layer 142 may contact the first transparent electrode layer 136 at both sides of each of the color filters 140a, 140b, and 140c.

In addition, the first and second transparent electrode layers 136 and 142 may be simultaneously patterned to form a double-layered pixel electrode (i.e., sandwich pixel electrode) that may include the first and second pixel electrodes 146 and 148 (in FIG. 3). The first and second transparent electrode layers 136 and 142 may be simultaneously patterned using a common mask, so that the sandwich pixel electrode may be formed corresponding to each of the pixel regions P. Alternatively, the first transparent electrode layer 136 may be patterned, the color filters may be formed thereon, and then the second transparent electrode layer 142 may be patterned. Each of the color filters 140a, 140b, and 140c may be interposed within the sandwich pixel electrode so that the color filter 140 may be located between the first and second pixel electrodes 146 and 148 (in FIG. 3).

In FIG. 4G, the second pixel electrode 148 may contact the first pixel electrode 146 at both sides of the color filter 140. Accordingly, as shown in FIG. 3, the sandwich pixel electrode may contact the thin film transistor T and may be connected in parallel to the storage capacitor $C_{ST}$.

In FIGS. 5G and 6G, when forming the sandwich pixel electrode of the first and second pixel electrodes 146 and 148 (in FIG. 4G), the first and second transparent electrode layers 136 and 142 may be disposed over the gate and data pads 106 and 120 and also may be patterned to form a double-layered gate pad terminal and a double-layered data pad terminal, respectively, over the gate pad 106 and over the data pad 120. The double-layered gate pad terminal may comprise the first and second gate pad terminals 150 and 152, and the double-layered data pad terminal may comprise the first and second data pad terminals 154 and 156. Accordingly, the array substrate for use in a liquid crystal display device, and more particularly, the color filters of the array substrate having the COT structure may be formed using the thermal imaging method. Alternatively, with reference to FIG. 4F, the thermal imaging method for forming the color filter may use an inkjet method.

Figure 7:
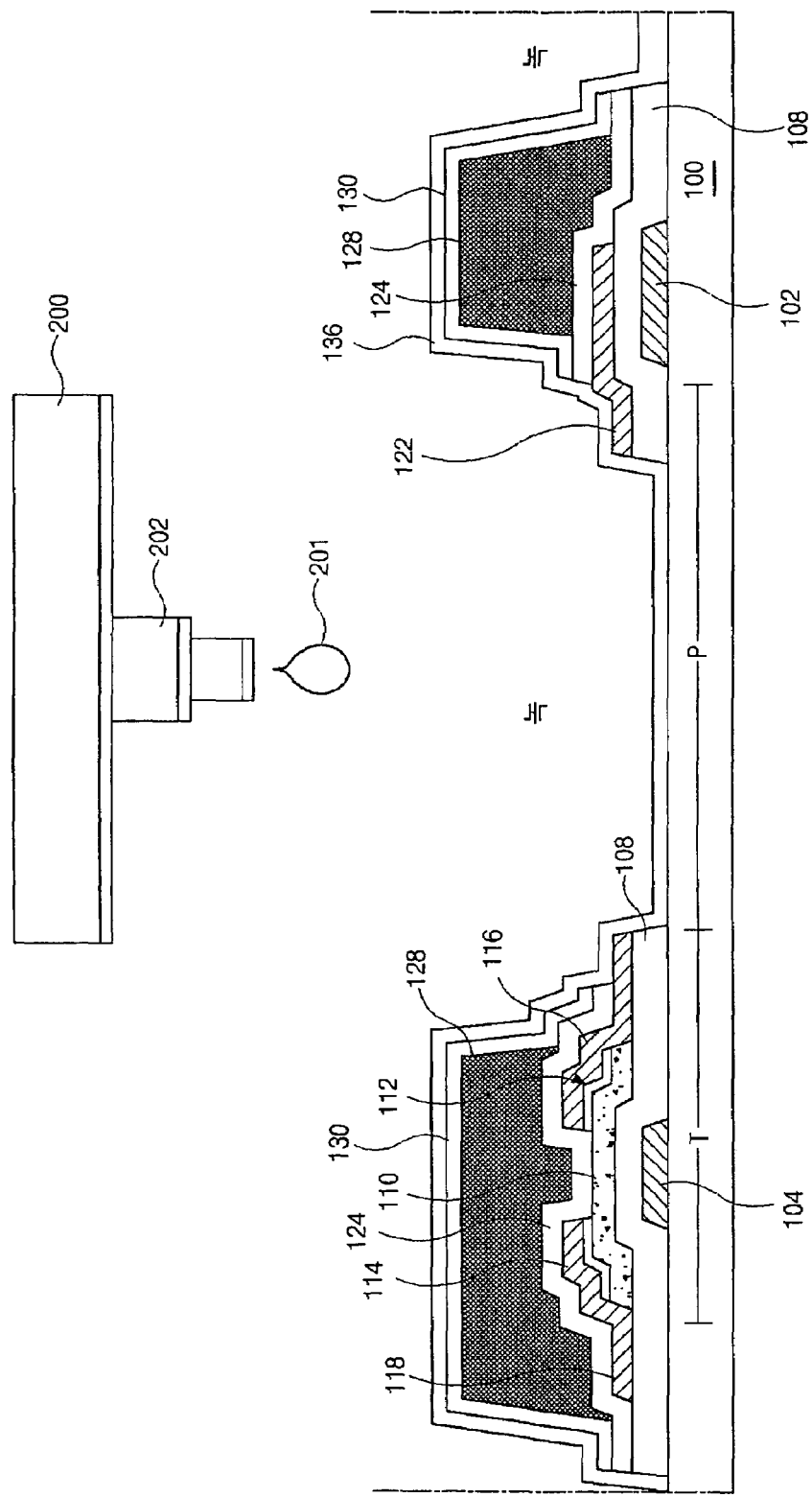
FIG. 7 is a cross sectional view of an exemplary pixel of an array substrate according to the present invention.

FIG. 7 is a cross sectional view of an exemplary pixel of an array substrate according to the present invention. FIG. 7 illustrates a step of forming the color filter that may be replaced for the step shown in FIG. 4F, wherein other processes of forming the array substrate may be similar to those shown in FIGS. 4A-4G except for the step of forming the color filter.

In FIG. 7, the thin film transistor T, which may include the gate electrode, the active layer 110, and the source and drain electrodes 114 and 116, may be placed on the substrate 100. The gate line 102 also may be placed on the substrate 100, and the data line 118 may be formed on the first insulating layer 108. In addition, the storage metal layer 122 may be formed on the first insulating layer 108, especially over the gate line 102. The second insulating layer 124 may cover the thin film transistor T and the storage metal layer 122, except for portions of the drain electrode 116 and storage metal layer 122. The black matrix 128 may be disposed corresponding to the thin film transistor T, the data line 118, and the gate line 102, and a the third insulating layer 130 may cover the black matrix 128. As described with reference to FIGS. 4A to 4G, the second and third insulating layers 124 and 130 may expose portions of the drain electrode 116 and portions of the storage metal layer 122, so that the first transparent electrode layer 136 may be formed to contact both the drain electrode 116 and the storage metal layer 122.

After forming the first transparent electrode layer 136, the color filter may be formed within the pixel region P using an inkjet method that drops a liquid-type color resin 201 into a desired one of the pixel regions P, wherein the dropped color resin 201 may be cured to be a desired color filter within the pixel region P. At this time, the black matrix 128 may function as a bulkhead that prevents leakage of the dropped liquid-type color resin 210. For example, the black matrix 128 may have a height of less than about 4 micrometers.

The liquid-type color resin 210 may be contained within an inkjet head 200, and may be injected through a nozzle 202 as a micro-droplet, wherein one micro-droplet of the color resin 210 may be about 0.4 picoliters (pl) to about 400 picoliters (pl). If a multi-inkjet head is used in the inkjet method, the plurality of color filters can be simultaneously formed within each of the plurality of pixel regions P. When the liquid-type color resin 210 is dropped, the liquid-type color resin 210 may include a solvent, wherein the solvent may be evaporated after the dropping process. The liquid-type color resin 210 may be cured to become the color filter. Accordingly, the color filters 140 (in FIG. 3) having red (R), green (G), and blue (B) colors may be complete, wherein the process of forming the double-layered pixel electrode, after the inkjet method, may be the same as the process of FIG. 4G.

According to the present invention, the method of forming the color filters using the thermal imaging method or the inkjet method can save the quantity of the color resin. Furthermore, since a developer and stripper may not be used for forming the color filter, the gate and data pads and other layer elements may not become damaged during the fabrication process, thereby stabilizing the fabrication process of the array substrate, simplifying the fabrication process, and reducing production costs. Moreover, since the black matrix and color filters may be formed on the array substrate, an aligning margin between lower and upper substrates may not be necessary, thereby increasing an aperture ratio.

It will be apparent to those skilled in the art that various modifications and variations can be made in the array substrate for liquid crystal display device and method of fabricating the same of the present invention without departing from the spirit or scope of the invention. Thus, it is intended that the present invention covers the modifications and variations of this invention provided they come within the scope of the appended claims and their equivalents.

What is claimed is:

1. A method of forming an array substrate device for use in a liquid crystal display device, comprising:

forming a gate line on a substrate along a first direction, the gate line including a gate pad at one end thereof;

forming a first insulating layer on the substrate to cover the gate line;

forming a data line over the first insulating layer along a second direction perpendicular to the first direction on the substrate, the data line defining a pixel region with the gate line and including a data pad at one end thereof;

forming a thin film transistor at a crossing region of the gate and data lines, the thin film transistor including a gate electrode, a semiconductor layer, a source electrode, and a drain electrode;

forming a black matrix overlapping the thin film transistor, the gate line, and the data line except a first portion of the drain electrode;

forming a second insulating layer over an entire surface of the substrate to cover the black matrix;

patterning the first and second insulating layers to expose the first portion of drain electrode, to form a gate pad contact hole exposing the gate pad, and to form a data pad contact hole exposing the data pad;

forming a first transparent electrode layer over an entire surface of the substrate to cover the patterned second insulating layer and contacting the exposed first portion of the drain electrode;

dropping a liquid-type color resin onto the first transparent electrode layer within the pixel region to form a color filter within the pixel region;

forming a second transparent electrode layer over an entire surface of the substrate to cover the color filter and the first transparent electrode layer; and patterning the first and second transparent electrode layers to form first and second pixel electrodes, a double-layered gate pad terminal, and a double-layered data pad terminal.

2. The method according to claim 1, wherein dropping the liquid-type color resin includes an inkjet head having a nozzle.

3. The method according to claim 2, wherein one microdroplet of the liquid-type color resin injected through the nozzle into the pixel region ranges from about 0.4 picoliters (pl) to about 400 picoliters (pl).

4. The method according to claim 1, wherein the liquid-type color resin includes a solvent.

5. The method according to claim 1, wherein the black matrix includes an opaque organic material having a low dielectric constant.

6. The method according to claim 1, wherein the liquid-type color resin includes one of red, green, and blue colors.

7. The method according to claim 1, wherein the first and second pixel electrodes form a sandwich pixel electrode structure.

8. The method according to claim 1, wherein the color filter is interposed between the first and second pixel electrodes.

9. The method according to claim 1, further comprising forming an additional insulating layer between the thin film transistor and the black matrix.

10. The method according to claim 1, wherein each of the first and second insulating layers include one of silicon nitride and silicon oxide.

11. The method according to claim 1, wherein each of the first and second transparent electrode layers includes at least one of indium tin oxide and indium zinc oxide.

12. The method according to claim 1, wherein forming the data line includes forming a storage metal layer on the first insulating layer over the gate line.

13. The method according to claim 12, wherein the second insulating layer exposes a first portion of the storage metal layer.

14. The method according to claim 13, wherein the first pixel electrode contacts the exposed first portion of the storage metal layer.

15. The method according to claim 12, wherein the storage metal layer and a portion of the gate line constitute a storage capacitor with the first insulating layer interposed between the storage metal layer and the gate line.

16. The method according to claim 1, wherein the first pixel electrode directly contacts the substrate.

* * * * *